(12) United States Patent
Fan et al.

(10) Patent No.: US 9,491,711 B2
(45) Date of Patent: *Nov. 8, 2016

(54) METHODS AND NODES FOR MULTIPLE USER MIMO SCHEDULING AND POWER CONTROL

(75) Inventors: Rui Fan, Beijing (CN); Jinhua Liu, Beijing (CN); Chan Li, Beijing (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/412,909

(22) PCT Filed: Jul. 6, 2012

(86) PCT No.: PCT/SE2012/050808
§ 371 (c)(1),
(2), (4) Date: Jan. 5, 2015

(87) PCT Pub. No.: WO2014/007712
PCT Pub. Date: Jan. 9, 2014

(65) Prior Publication Data
US 2015/0131572 A1 May 14, 2015

(51) Int. Cl.
*H04W 4/00* (2009.01)
*H04W 52/14* (2009.01)
(Continued)

(52) U.S. Cl.
CPC ......... *H04W 52/146* (2013.01); *H04B 7/0452* (2013.01); *H04W 52/243* (2013.01); *H04W 52/42* (2013.01); *H04W 52/54* (2013.01); *H04W 72/12* (2013.01)

(58) Field of Classification Search
None
See application file for complete search history.

(56) References Cited

U.S. PATENT DOCUMENTS 8,498,194 B2 * 7/2013 Tian ..................... H04B 7/0452
370/203
2008/0239938 A1 * 10/2008 Jalloul ..................... H04L 5/023
370/201
(Continued)

FOREIGN PATENT DOCUMENTS

EP 2173041 A1 4/2010
EP 2252117 A1 11/2010

OTHER PUBLICATIONS

International Preliminary Report on Patentability for International Application No. PCT/SE2012/050808, mailed Jan. 6, 2015, 6 pages.
(Continued)

*Primary Examiner* — Michael J Moore, Jr.
(74) *Attorney, Agent, or Firm* — Patents on Demand, P.A.; Brian K. Buchheit; Scott M. Garrett (57) ABSTRACT

The present invention relates to a method in a first User Equipment (UE) served by a radio base station (RBS) of a wireless network, for uplink power control at Multiple User Multiple-Input-Multiple-Output (MU-MIMO) scheduling. The method comprises obtaining a power adaptation parameter for use in uplink transmission power control when the first UE is scheduled to be in pair with a second UE, or is scheduled to be de-paired from the second UE. The method also comprises receiving an indication from the radio base station to use the obtained power adaptation parameter in uplink transmission power control, and adapting an uplink transmission power based on the obtained power adaptation parameter and the received indication. The present invention also relates to the corresponding method in the RBS, and to the UE and the RBS.

30 Claims, 5 Drawing Sheets

(51) Int. Cl.
*H04W 52/24* (2009.01)
*H04W 52/42* (2009.01)
*H04W 52/54* (2009.01)
*H04B 7/04* (2006.01)
*H04W 72/12* (2009.01)

(56) References Cited

U.S. PATENT DOCUMENTS

| | | | |
|---|---|---|---|
| 2010/0105406 A1* | 4/2010 | Luo | H04W 52/241 |
| | | | 455/452.2 |
| 2011/0032813 A1* | 2/2011 | Tian | H04B 7/0452 |
| | | | 370/203 |
| 2011/0034206 A1* | 2/2011 | Venkatraman | H04B 7/0452 |
| | | | 455/522 |
| 2011/0306384 A1 | 12/2011 | Wei | |
| 2012/0257519 A1* | 10/2012 | Frank | H04L 5/0035 |
| | | | 370/252 |
| 2015/0195842 A1* | 7/2015 | Fan | H04W 72/1226 |
| | | | 370/329 |
| 2015/0208433 A1* | 7/2015 | Fan | H04L 5/0023 |
| | | | 370/329 |

OTHER PUBLICATIONS

International Search Report and Written Opinion for International Application No. PCT/SE2012/050808 mailed Mar. 18, 2013, 9 pages.

* cited by examiner

METHODS AND NODES FOR MULTIPLE USER MIMO SCHEDULING AND POWER CONTROL

CROSS-REFERENCE TO RELATED APPLICATIONS

This application is a National stage of International Application No. PCT/SE2012/050808, filed Jul. 6, 2012, which is hereby incorporated by reference.

TECHNICAL FIELD

The disclosure relates to Multiple User (MU) Multiple-Input-Multiple-Output (MIMO) scheduling, and more specifically to methods and nodes for supporting uplink power control when performing MU-MIMO scheduling.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a User Equipment (UE) is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to a UE and receiving signals transmitted by a UE.

Figure 1:
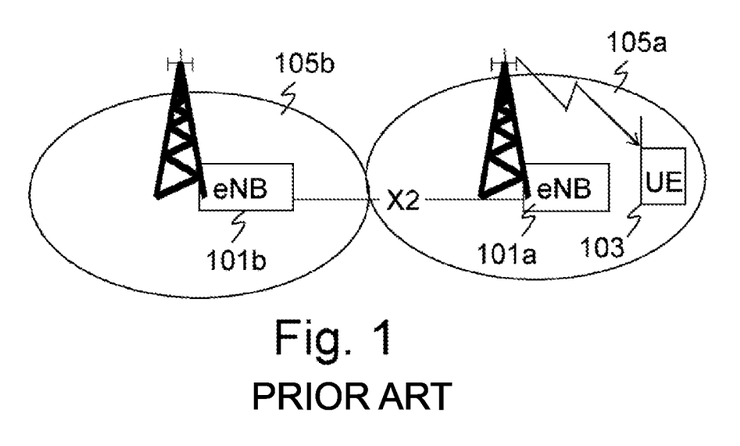
FIG. 1 is a schematic illustration of a radio access network in LTE.

FIG. 1 illustrates a radio access network in an LTE system. An eNB 101a serves a UE 103 located within the RBS's geographical area of service or the cell 105a. The eNB 101a is directly connected to the core network. The eNB 101a is also connected via an X2 interface to a neighboring eNB 101b serving another cell 105b. Although the eNBs of this example network serves one cell each, an eNB may serve more than one cell.

Figure 2:
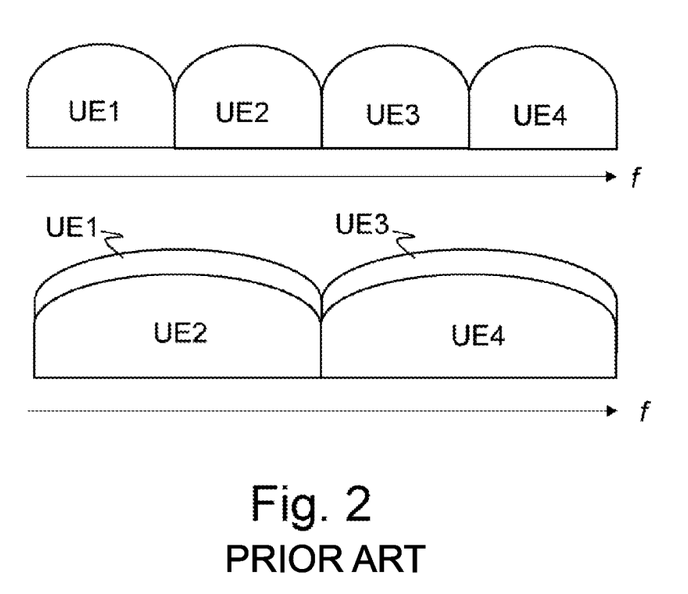
FIG. 2 is a schematic illustration of MU-MIMO scheduling.

Release 8 of LTE supports uplink MU-MIMO, which implies uplink transmissions from multiple UEs using the same uplink time-frequency resource and relying on the availability of multiple receive antennas at the RBS to separate the two or more transmissions. The difference between ordinary Frequency Division Multiplexing (FDM) scheduling and MU-MIMO scheduling is schematically illustrated in FIG. 2. In the upper part of FIG. 2, all UEs (UE1, UE2, UE3, UE4) are allocated different resource blocks in frequency, also referred to as FDM scheduling. In the lower part of FIG. 2, MU-MIMO scheduling is illustrated, where UE1 and UE2 are co-scheduled on the same resources in frequency, and UE3 and UE4 are co-scheduled on the same resources.

One important benefit of uplink MU-MIMO is that it can get similar gain in system throughput as Single User (SU)-MIMO where spatial multiplexing is used, without the need for multiple transmission antennas at the UE side. MU-MIMO thus allows for a less complex UE implementation. The potential system gain of uplink MU-MIMO relies on more than one UE being available for transmission using the same time-frequency resource. The process of pairing UEs that should share the same time-frequency resources is non-trivial and requires suitable radio-channel conditions.

Figure 3:
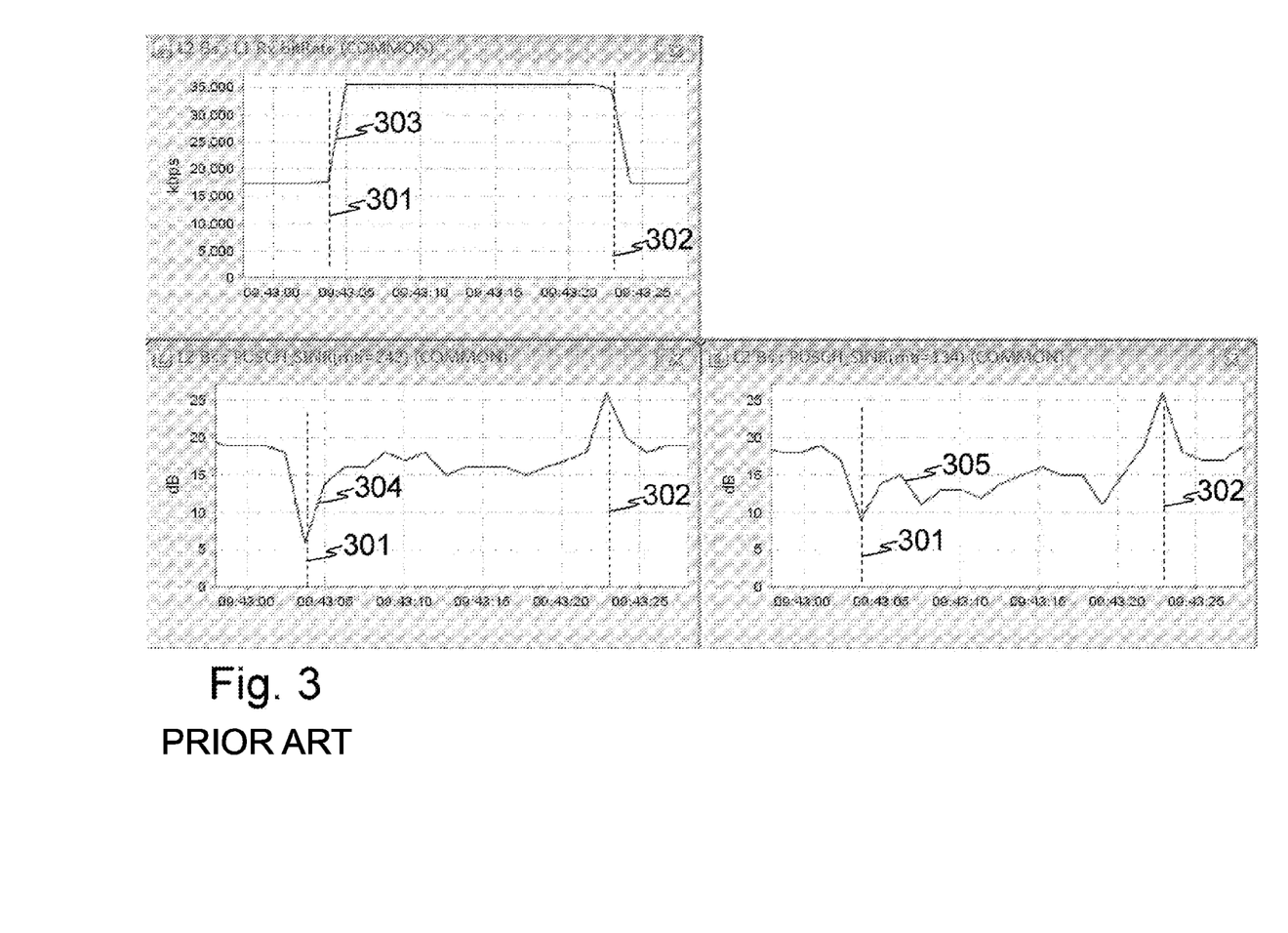
FIG. 3 shows three graphs illustrating bit rate and SINR variations at MU-MIMO scheduling according to a field test result.

Ideally, UEs that are paired, i.e., the UE group size is two, should have orthogonal or almost orthogonal channels, so that they cause as little interference as possible to each other. If the two signals can be perfectly separated at the receiver, and both signals are transmitted with the same power as in the single UE case, there is a potential for a 100% cell or UE throughput gain without power increase. However, the radio channel of the paired UEs are seldom ideally orthogonal to each other, which means the signal of one paired UE may contribute with a relatively large interference to the other one. Thus the interference that one UE experiences after being paired with another UE using MU-MIMO scheduling may be increased quite much compared to if the UEs are not paired, and thus are not MU-MIMO scheduled. Similarly, the interference that one UE experiences after being scheduled in normal FDM may be decreased quite much compared to when the UE is scheduled in pair with another UE. Therefore, MU-MIMO scheduling may cause an abrupt Signal to Interference and Noise Ratio (SINR) variation, which is illustrated in the three graphs in FIG. 3. The upper left graph, 303, illustrates the uplink bit rate in kilobits per second (kbps) over time for a cell. The lower left graph, 304, illustrates the SINR for the Physical Uplink Shared Channel (PUSCH) in dB over time for the first UE with a Radio Network Temporary Identifier (RNTI) equal to 242, and the right hand graph, 305, illustrates the SINR for the PUSCH in dB over time for a second UE with a Radio Network Temporary Identifier (RNTI) equal to 134. When the first and the second UE switch from non-MU-MIMO scheduling to MU-MIMO scheduling in pair with each other, which happens at a time indicated by the broken line 301 in all three graphs, the uplink bit rate of the cell increases from around 18000 kbps to around 36000 kbps while the first and the second UEs' SINR are abruptly decreased. This means that the two UEs' transmission power should be increased accordingly to meet the SINR or SINR target requirement. Analogously, the UEs' SINR increase abruptly when the first and second UEs switch from MU-MIMO scheduling in pair to a de-paired non-MU-MIMO scheduling, which happens at a time indicated by the broken line 302 in all three graphs. At de-pairing, the UEs' transmission power should be decreased accordingly in order to generate less interference and to decrease the power consumption by this UE.

The specified power control step size for uplink transmission power control is given by [−1, 0, 1, 3] dB, meaning that the maximum step size is minus 1 dB when the power is to be decreased, and plus 3 dB when the power is to be increased for a UE. In each Round Trip Time (RTT), which corresponds to approximately 5 milliseconds (ms), the power may thus at the most be increased by 3 dB or decreased by 1 dB using transmission power control commands. However, the difference between MU-MIMO and non-MU-MIMO SINR in the switch instant is quite large as exemplified with the field test results shown in the graphs of FIG. 3. Therefore it will take quite some time for the power control to follow the abrupt SINR variation. As may be seen in the graphs of FIG. 3, the SINR variation may be up to 15 dB. With a step size of +3 dB, it would take 5 RTT or 25 ms to adapt the power to the SINR change. Such an abrupt interference or SINR variation may also happen when the scheduler in the RBS changes the partner of one paired UE, e.g. due to changes of radio channel orthogonality between different UEs.

There are currently three different scheduling schemes with different complexity applied for MU-MIMO scheduling:
1. Static scheduling, i.e. the UEs are randomly divided into pairs of two UEs. The pairs persist as long as all UEs remain active.
2. Island scheduling, i.e. UEs are paired with each other only if both of them have a larger estimated throughput compared to non-MU-MIMO scheduling. The estimated throughput is based on an estimated SINR which takes the interference from the other paired UE into account.
3. Proportional Fair in Time and Frequency (PFTF) scheduling, i.e. UEs are paired with each other on resource blocks in which they may have the largest throughput. The scheduling thus considers frequency selectivity in addition to the considerations in scheduling scheme 2 above.

The drawback of scheduling scheme 1 is that the interference between MU-MIMO UEs is not considered when deciding to pair the UEs. The UEs could be paired with each other using MU-MIMO scheduling, even when the decision results in a cell or UE throughput loss compared to non-MU-MIMO scheduling.

The drawback of scheme 2 and 3 is that a UE will experience abrupt interference and SINR variation quite often, as UEs frequently get paired or de-paired or changes their MU-MIMO pair partner. Since power control and/or SINR measurements cannot follow this abrupt SINR quickly enough, the link adaptation may be seriously affected. The link adaptation deterioration may finally result in both a UE and a cell performance degradation.

SUMMARY

It is therefore an object to address some of the problems outlined above, and to provide a solution for a more efficient uplink power control to address the abrupt SINR variations occurring when performing MU-MIMO scheduling. This object and others are achieved by the methods, the RBS and the UE according to the independent claims, and by the embodiments according to the dependent claims.

According to a first aspect of embodiments, a method in a radio base station of a wireless network for supporting uplink power control when performing MU-MIMO scheduling is provided. The method comprises when scheduling a first UE in pair with a second UE, or scheduling the first UE de-paired from the second UE, transmitting an indication to the first UE to use a power adaptation parameter for uplink transmission power control. The power adaptation parameter enables the first UE to adapt an uplink transmission power to an interference change due to pairing or de-pairing with the second UE.

According to a second aspect of embodiments, a method in a first UE served by a radio base station of a wireless network, for uplink power control at MU-MIMO scheduling is provided. The method comprises obtaining a power adaptation parameter for use in uplink transmission power control when the first UE is scheduled in pair with a second UE, or is scheduled de-paired from the second UE. The method also comprises receiving an indication from the radio base station to use the obtained power adaptation parameter in uplink transmission power control. The method further comprises adapting an uplink transmission power based on the obtained power adaptation parameter and the received indication.

According to a third aspect of embodiments, an RBS of a wireless network is provided. The RBS is configured to support uplink power control when performing MU-MIMO scheduling. The RBS comprises a transmitter configured to transmit an indication to a first UE to use a power adaptation parameter for uplink transmission power control when the radio base station schedules a first UE in pair with a second UE, or schedules the first UE de-paired from the second UE. The power adaptation parameter enables the first UE to adapt an uplink transmission power to an interference change due to pairing or de-pairing with the second UE.

According to a fourth aspect of embodiments, a first UE is provided. The first UE is configured to be served by an RBS of a wireless network. The UE is also configured for uplink power control at MU-MIMO scheduling. The UE comprises a processing circuit configured to obtain a power adaptation parameter for use in uplink transmission power control when the first UE is scheduled in pair with a second UE, or is scheduled de-paired from the second UE. The UE also comprises a receiver configured to receive an indication from the RBS to use the obtained power adaptation parameter in uplink transmission power control. The processing circuit is further configured to adapt an uplink transmission power based on the obtained power adaptation parameter and the received indication.

An advantage of embodiments is that the UE transmission power is quickly adjusted to the new interference situation after a MU-MIMO scheduling. This makes it possible to avoid additional interference to a neighbor cell and to meet the requirements for MU-MIMO scheduling.

Other objects, advantages and features of embodiments will be explained in the following detailed description when considered in conjunction with the accompanying drawings and claims.

DETAILED DESCRIPTION

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of methods and nodes, they may also be embodied in a computer program product as well as in a system comprising a computer processor and a memory coupled to the processor, wherein the memory is encoded with one or more programs that may perform the functions disclosed herein.

Embodiments are described in a non-limiting general context in relation to an example scenario with MU-MIMO in an LTE network with up to two UEs scheduled simultaneously. However, it should be noted that embodiments may also be applied when more than two UEs are co-scheduled, i.e., scheduled over the same time-frequency resources. Embodiments may also be applied to any radio access network technology similar to an E-UTRAN implementing MU-MIMO scheduling, such as Code Division Multiple Access (CDMA) 2000, WIMAX, Wideband CDMA (WCDMA), and Time Division (TD) CDMA.

The problem of slow UE transmission power adaptation to the often abrupt SINR changes at MU-MIMO-scheduling is addressed by a solution where the RBS transmits an indication the UE to use a special power adaptation parameter when the UE is scheduled paired with another UE or de-paired from another UE. The power control procedure is thereby optimized for paired and de-paired scheduling so that the UE transmit power can follow the SINR or interference variation more quickly.

Furthermore, embodiments of the present invention relates to two complementary procedures to address the problem of the SINR variance in case of MU-MIMO scheduling:

1. Improved MU-MIMO scheduling. A cautious UE pairing and de-pairing scheduling scheme is disclosed. The object is to reduce the frequency of abrupt interference or SINR variation occurrences due to MU-MIMO scheduling. The proposed scheduling procedure helps reducing the frequency by using thresholds for deciding when to pair or de-pair the UEs.
2. Improved MU-MIMO link adaptation. In embodiments of the invention, the SINR due when a UE is paired or de-paired is predicted based on an estimated interference change, and the link adaptation is based on the predicted SINR. In this way a more suitable transport format may be selected for use during the initial phase of the new MU-MIMO pair or de-pair scheduling.

The power control solution briefly described above and more thoroughly described hereinafter may be combined with either the improved MU-MIMO scheduling described under 1 above, or with the improved MU-MIMO link adaptation described under 2 above, or with both of them. The improved MU-MIMO scheduling and link adaptation procedures are also more thoroughly described below.

Improved MU-MIMO Power Control

As already briefly mentioned in the background section, the conventional power adjustment range of each power control step is given by the step size configuration [−1, 0, 1, 3] dB. However, the difference between expected SINR and true SINR is quite large at a point in time when the UE is scheduled from paired to de-paired or the opposite. It may take several RTTs to reach the SINR target or the required SINR. The problem is more severe when the UE switches from scheduled in pair to scheduled alone, as it takes longer time to decrease than to increase the UE transmission power since the maximum step for decreasing is only minus 1 dB. Excessively high transmission power during the switch from paired scheduling to de-paired scheduling results in a high interference to neighbor cells. It would therefore be advantageous to provide a faster UE transmission power adjustment to reach a reasonable power level in shorter time, as that minimizes the interference generated in neighbor cells.

According to prior art, the UE transmission power is calculated according to the following equation:

$$UE\_TX\_power = P_0 + \alpha * PL_{DL} + \Delta_{MCS} + 10 * \log_{10}(M) + f(\Delta_{TPC}) \quad [1]$$

UE_TX_power is the adjusted UE transmission power, $P_0$ is the desired or target received power per resource block at eNodeB, $\Delta_{MCS}$ is the modulation and coding scheme used for current PUSCH transmission, M is the number of resource blocks used for current PUSCH transmission, $f(\Delta_{TPC})$ is an accumulated Transmission Power Control (TPC) command sent from the eNodeB to the UE, $PL_{DL}$ is a downlink path loss between the eNodeB and the UE, and $\alpha$ is a path loss compensation factor.

In embodiments, a special power adaptation parameter is used for adapting the power control equation [1] to a MU-MIMO scheduling case, such that the power may be adjusted to the abrupt SINR changes immediately. The following three alternative embodiments of the power control method are provided:

A. In a first step, a special power adaptation parameter for uplink transmission power control, such as the special power offset in the first embodiment described below, or the special power step size in the second embodiment described below, are transmitted to a UE e.g. using Radio Resource Control (RRC) signaling. In a second step, the eNodeB indicates to the UE that the UE is going to be paired or de-paired with another UE. This indication may be sent to the UE in a MAC CE or in a Physical Downlink Control Channel (PDCCH). In a third step, the UE adjusts its power control using the special power adaptation parameter.

B. In this embodiment, the eNodeB and the UE are configured to use a pre-defined power adaptation parameter, which means that the first step described in embodiment A is not needed in this embodiment. Embodiment B thus comprises the second and the third steps described in embodiment A, of the UE receiving an indication from the eNodeB and adjusting the power control accordingly.

C. In this embodiment, the step of the eNodeB sending a special power adaptation parameter is performed when the eNodeB plans to pair or de-pair the UE. The transmission of the special power adaptation parameter also serves as the indication for adjusting the power control. Once the UE receives the special power adaptation parameter e.g. in RRC signaling, the UE will apply the special power adaptation parameter directly for adjusting the power control. The transmission of the special power adaptation parameter thus serves both as the indication to apply the special power control adapted for MU-MIMO pairing or de-pairing, and as the value of the power adaptation parameter to use for the special power control.

In a first embodiment of the present invention, the special power adaptation parameter comprises new power offsets. The new power offsets are introduced in addition to the normal power control, to compensate for the sudden interference change. These new power offsets can be introduced in Equation 1 to calculate the UE transmission power when transmitting the first subframe after the users are scheduled paired or de-paired, according to the following:

$$\text{UE\_TX\_power} = \begin{cases} P_0 + \alpha * PL_{DL} + \Delta_{MCS} + 10 * & \text{paired} \\ \log_{10}(M) + f(\Delta_{TPC} + \Delta_{Pair}) \\ P_0 + \alpha * PL_{DL} + \Delta_{MCS} + 10 * & \text{depaired} \\ \log_{10}(M) + f(\Delta_{TPC} - \Delta_{Depair}) \end{cases} \quad [2]$$

$\Delta_{Pair}$, $\Delta_{Depair}$ may e.g. be defined as new information in the existing Information Element (IE) UplinkPowerControlDedicated. The information in the IE may thus be used to compensate for special power requirements valid during a change of scheduling from MU-MIMO pairing to de-pairing or vice versa. The new power offsets may be conveyed to the UE in dedicated RRC signaling, according to embodiment A described above. The new power offsets may alternatively be pre-defined, in accordance with embodiment B above.

The scheduler in the RBS thus notifies the UE to calculate the transmission power using the lower part of equation [2], when one UE is to be scheduled from paired to de-paired. This may e.g. be done by indicating to the UE that it is to be scheduled from paired to de-paired in a Media Access Control (MAC) Control Element (CE). The UE will then know what power offset to use in equation [2] when it calculates the transmission power. In this way, the interference caused by this UE to neighbor cells is reduced immediately, and the SINR may approximately meet the SINR target immediately as well.

Analogously, when one UE is to be scheduled from de-paired to paired, the scheduler notifies the UE to calculate the total transmit power using the upper part of equation [2]. In this way, the UE can quickly increase its power and meet the abruptly changed SINR requirement at once.

The UE may apply Equation [2] to calculate the transmission power at the specific subframe corresponding to the MAC CE with the indication from the eNodeB. If there is a remaining mismatch between the resulting SINR and the SINR target, the mismatch may be easily compensated by the normal power control procedure.

In a second embodiment, the special power adaptation parameter comprises a new step size configuration. A large step size may be pre-defined or configured to handle the large SINR variation due to MU-MIMO pairing or de-pairing, and a small step size may be pre-defined or configured for a stable situation without MU-MIMO scheduling changes. In one example embodiment, a step size table given by [−y, −x, x, y] dB is used, where x is configured or pre-defined to be between 0.5 and 1, to allow for adjustments to the small SINR changes, while y can be configured or pre-defined to be between 3 and 5 to allow for adjustments to the large SINR changes occurring at MU-MIMO scheduling changes. The TPC command may be sent to the UE at a number D of subframes in advance of the subframe when the de-pairing or pairing action occurs, where D is the TPC delay. This allows for an even faster adjustment of the power so that the impact of the SINR variation is minimized.

Such a new step size configuration may be either broadcasted in an uplink MU-MIMO capable system for all UEs, or it may be sent to some dedicated UEs that have a high possibility to be scheduled in MU-MIMO mode via RRC signaling or other commands or orders.

Improved MU-MIMO Scheduling

As mentioned above, abrupt interference or SINR variation occurs when a UE switches between paired scheduling and non-paired scheduling, or switches to another pair partner during paired scheduling. Therefore the UE pairing and de-pair in MU-MIMO scheduling should be done more cautiously to avoid frequent SINR variations. The criterions for cautious MU-MIMO scheduling are:

1. One UE can only be scheduled in pair with another UE when the estimated throughput gain of the two UEs scheduled in pair relative to the two UEs scheduled unpaired is higher than a certain threshold called ThresA, and when both UEs individually get a positive throughput gain. ThresA may in one exemplary embodiment be the x-th percentile, e.g. the $50^{th}$ percentile.
2. Two paired UEs can only be de-paired when the estimated throughput gain of the two UEs scheduled in pair relative to the two UEs scheduled unpaired is lower than another threshold called ThresB, or one of the paired UEs can get a higher throughput when not paired. ThresB may in an exemplary embodiment be the y-th percentile, e.g. the 20-th percentile.
3. Paired UEs can only change pair partner when the estimated throughput gain of the new pair relative to the original pair is higher than certain pre-determined threshold called ThresC. ThresC may in an exemplary embodiment be the z-th percentile, e.g. the 20-th percentile. As an example, a UE a—paired with a UE b—may only change pair partner to UE c if the estimated throughput gain of the pair UE a+UE c is higher than that of the UE pair UE a+UE b.

The throughput may be estimated based on an uplink channel and the uplink power headroom of the UEs. The thresholds ThresA, ThresB, and ThresC may be tuned based on either simulations or field tests.

Furthermore, to avoid triggering a UE pairing, de-pairing, or pair partner change due to an instant radio channel peak or dip, an attack-decay filter may be applied to the calculated throughput gain given by the following equation:

$$\text{gainThp}(n) = \text{gainThp}_{inst} \cdot \alpha + \text{gainThp}(n-1) \cdot (1-\alpha) \quad [3]$$

gainThp(n) is the filtered throughput gain in the present Transmission Time Interval (TTI); gainThp$_{inst}$ is the estimated instant throughput gain in the present TTI; $\alpha$ is the filter coefficient which may take a value from 0 to 1 and which should be tuned; gainThp(n−1) is the filtered throughput gain in the previous TTI.

The procedure for the improved MU-MIMO scheduling may thus comprise a first step where the system estimates the throughput gain of a paired scheduling relative to a de-paired scheduling for each possible UE pair or for the UE pair that is being scheduled, and a second step where the RBS pairs, de-pairs, or changes pair partners according to the criterions mentioned above under bullets 1, 2 and 3.

An advantage of these scheduling procedure embodiments is that the impact due to the abrupt SINR variation is well considered during the MU-MIMO scheduling. Unnecessary MU-MIMO scheduling actions such as pairing, de-pairing, pair partner changes are thus avoided. As a consequence, the frequency of the abrupt SINR variation is reduced, which in turn alleviates the burden on the link adaptation.

Improved MU-MIMO Link Adaptation

When a scheduler in an RBS intends to switch UEs from paired to de-paired scheduling or vice versa, or to change a pair partner of a UE during MU-MIMO scheduling, the resulting SINR variation cannot be captured quickly enough by the current measurement module due to measurement delays and filtering of the SINR measurement. More specifically, the reported SINR from Layer 1 (L1) at time t that the link adaptation is based on cannot reflect the actual SINR that a UE experienced at time t+K, where K is typically equal to or larger than 4 ms. This is due to the delay counted from the time instant when an uplink grant is sent, to the time instant when the UE actually transmits. This may result in either a too aggressive transport format selection when switching from de-paired to paired scheduling, or in a too conservative transport format selection when switching from paired to de-paired scheduling.

Therefore, in embodiments of the invention, the link adaptation is performed based on a predicted SINR instead of the SINR measured by L1 at the time of the scheduling action. The SINR is predicted in different ways depending on if the interference change is caused by a UE pairing, de-pairing, or pair partner change. The method to predict the SINR may be different for different receivers. A simple method to estimate the SINR of a UE when it is going to be paired with another UE, when an MRC receiver is used, may be exemplified with the following equation:

$$SINR_{UEi} = \frac{P_{rx,UEi}}{\gamma P_{rx,UEi} + \beta P_{rx,UEj} + I_{other}} \quad [4]$$

where $UE_j$ is paired with $UE_i$, $\gamma(0\text{-}1)$ is the coefficient of self-interference, $\beta(0\text{-}1)$ is the coefficient of the interference from the paired UE, and $I_{other}$ comprises the thermal noise and the interference from other UEs that are not scheduled in pair with $UE_i$. Furthermore, $P_{rx,UEi}$ and $P_{rx,UEj}$ are the received power for $UE_i$ and $UE_j$ respectively. $\gamma$ and $\beta$ may either be dynamically calculated according to the radio conditions, or they may correspond to well tuned predetermined values.

Once the L1 SINR measurement is accurate enough, the traditional link adaption may be used.

One example embodiment of this new link adaptation procedure is given hereinafter. In the following, SINR is used as a short version of PUSCH SINR:

1. At time instance t1, the scheduler wants to pair UE a and UE b which have not been working in paired mode previously. At this time instance the SINR of each of the UEs is $SINR_{a\_meas}$ and $SINR_{b\_meas}$ respectively.
2. Instead of using $SINR_{a\_meas}$ and $SINR_{b\_meas}$ for link adaptation, the scheduler predicts a SINR for each UE as paired. Assuming that $SINR_{a\_pred}$ and $SINR_{b\_pred}$ are the predicted SINR values for the two UEs, $SINR_{a\_pred}$ and $SINR_{b\_pred}$ are used for the link adaptation instead of the measured SINR values. The SINR values may be predicted for the newly paired UEs and used in the corresponding link adaption until the first measured SINRs corresponding to the paired transmission for the two UEs are available.
3. At time t2, the first measured SINRs corresponding to the paired transmission of user a and b are available. The measured SINRs are set as filtered SINRs for UE a and UE b respectively, and these measured SINRs are used for the link adaptation. After t2, the filtered SINRs are used directly in the link adaptation for the two paired UEs respectively.
4. At time instance t3, the scheduler decides to de-pair UE a and UE b, and the current measured SINRs for the two UEs are $SINR_{a\_meas\_3}$ and $SINR_{b\_meas\_3}$ respectively.
5. Instead of using $SINR_{a\_meas\_3}$ and $SINR_{b\_meas\_3}$ for link adaptation, the scheduler predicts the SINR for each UE as de-paired. If $SINR_{a\_pred\_3}$ and $SINR_{b\_pred\_3}$ are the predicted de-paired SINRs for the two UEs, $SINR_{a\_pred\_3}$ and $SINR_{b\_pred\_3}$ are used for the link adaptation. The predicted SINRs for the de-paired transmission of the two UEs are used in link adaptation until the first measured SINR corresponding to the de-paired transmission of the two UEs is available, and the corresponding SINR filters of the two UEs are reset accordingly.

Embodiments of Methods and Nodes

Figure 4A:
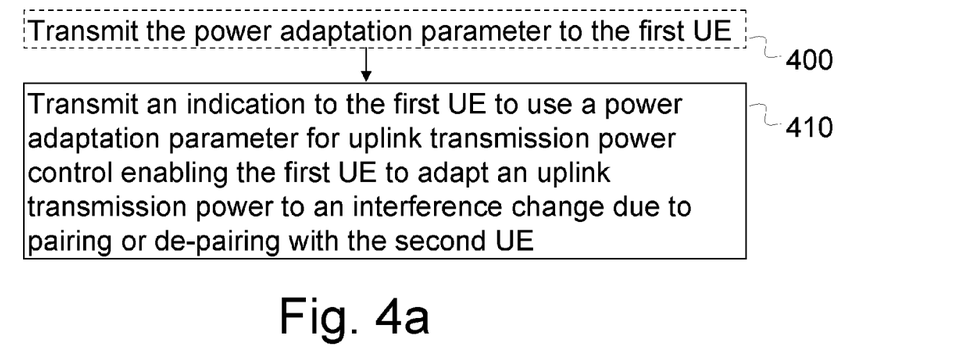
FIGS. 4a-4b are flowcharts illustrating the method in an RBS according to embodiments.

FIG. 4a is a flowchart illustrating an embodiment of a method in an RBS of a wireless network, for supporting uplink power control when performing MU-MIMO scheduling. When scheduling a first UE in pair with a second UE, or scheduling the first UE de-paired from the second UE, the method comprises:

410: Transmitting an indication to the first UE to use a power adaptation parameter for uplink transmission power control. The power adaptation parameter enables the first UE to adapt an uplink transmission power to an interference change due to pairing or de-pairing with the second UE. The indication may be transmitted in a MAC control element or in a PDCCH.

According to embodiment A described above in the section "Improved MU-MIMO power control", the method further comprises before transmitting, 410, the indication:

400: Transmitting the power adaptation parameter to the first UE. The power adaptation parameter may be transmitted in a dedicated RRC message or in a broadcast message.

According to embodiment C described above in the section "Improved MU-MIMO power control", transmitting, 410, the indication comprises transmitting the power adaptation parameter to the first UE.

According to the first embodiment described in the section "Improved MU-MIMO power control", the power adaptation parameter comprises a positive power step size for uplink transmission power control when the first UE is scheduled in pair with the second UE, and a negative power step size for uplink transmission power control when the first UE is scheduled de-paired from the second UE. According to the second embodiment described in the section "Improved MU-MIMO power control", the power adaptation parameter comprises a first transmission power offset for uplink transmission power control when the first UE is scheduled in pair with the second UE, and a second transmission power offset for uplink transmission power control when the first UE is scheduled de-paired from the second UE.

Figure 4B:
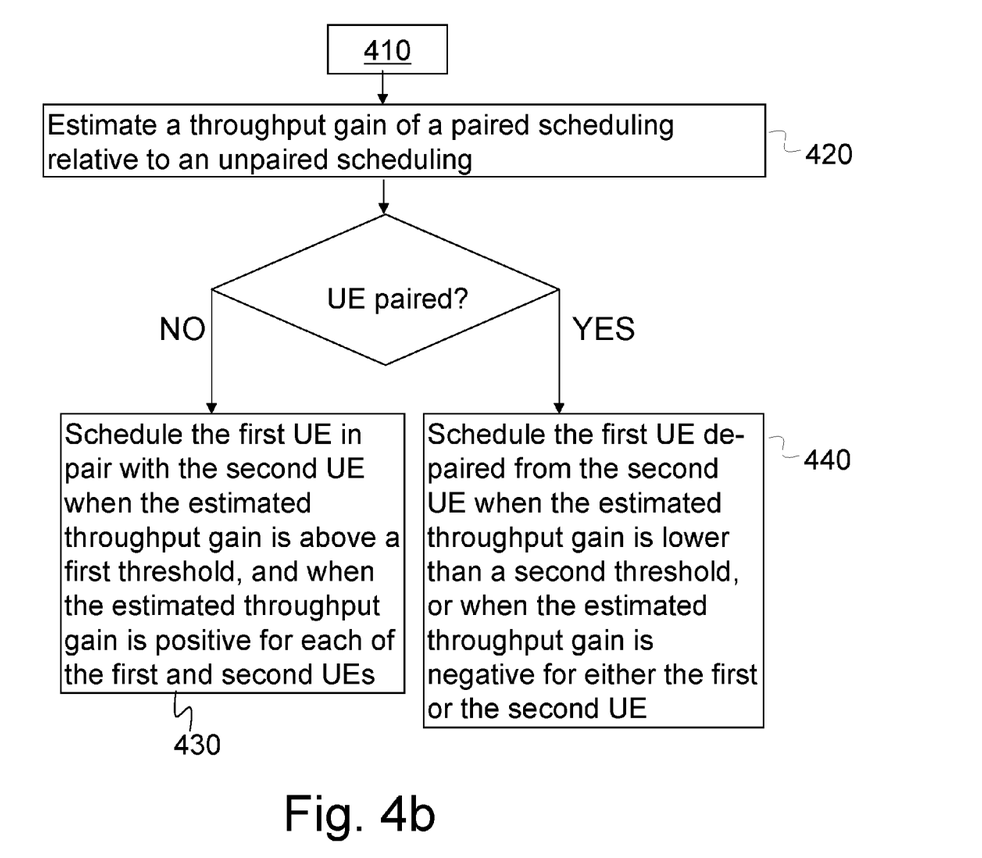

FIG. 4b is a flowchart illustrating an embodiment where the power control embodiments described with reference to FIG. 4a are combined with the scheduling embodiments described above. The method comprises the following, in addition to step 410 of transmitting an indication to the first UE to use a power adaptation parameter for uplink transmission power control:

420: Estimating a throughput gain of a paired scheduling relative to an unpaired scheduling for a UE pair comprising the first UE and the second UE, and for each of the first and the second UEs individually.

430: When the first UE is initially unpaired, scheduling the first UE in pair with the second UE when the estimated throughput gain for the UE pair is above a first threshold, and when the estimated throughput gain is positive for each of the first and second UEs.

440: When the first UE is initially paired with the second UE, scheduling the first UE de-paired from the second UE when the estimated throughput gain for the UE pair is lower than a second threshold, or when the estimated throughput gain is negative for either the first or the second UE.

The method may also be complemented with the link adaptation embodiments described above. The method may thus further comprise when scheduling, in 430, the first UE in pair with the second UE:
- Predicting a signal to noise and interference value for each of the first and the second UE as paired.
- Using the predicted signal to noise and interference values when performing link adaptation.

The method may further comprise when scheduling, in 440, the first UE de-paired from the second UE:
- Predicting a signal to noise and interference value for each of the first and the second UE as de-paired.
- Using the predicted signal to noise and interference values when performing link adaptation.

Figure 5:
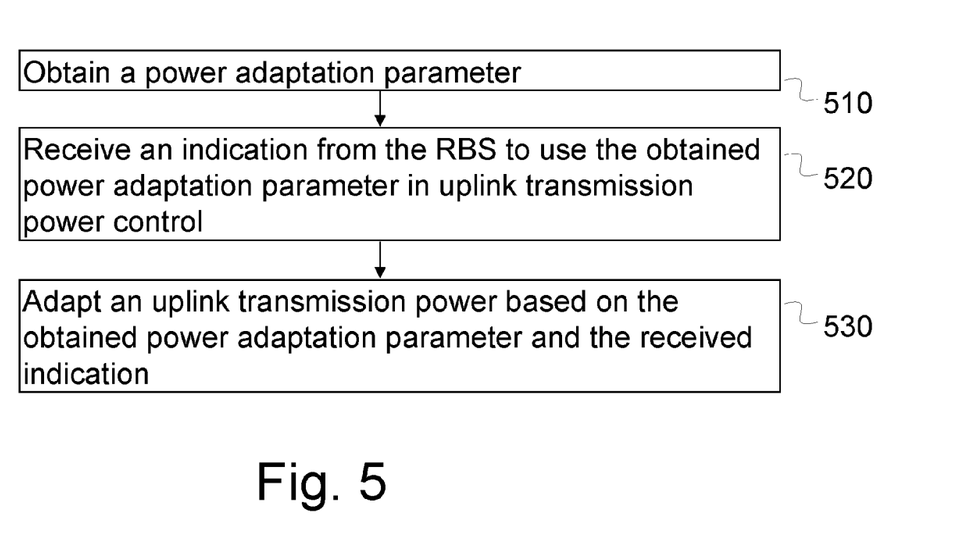
FIG. 5 is a flowchart illustrating the method in a UE according to embodiments.

FIG. 5 is a flowchart illustrating an embodiment of a method in a first UE served by an RBS of a wireless network, for uplink power control at MU-MIMO scheduling. The method comprises:
- 510: Obtaining a power adaptation parameter for use in uplink transmission power control when the first UE is scheduled in pair with a second UE, or is scheduled de-paired from the second UE. In accordance with embodiment B described above in the section "Improved MU-MIMO power control", the power adaptation parameter may be pre-defined, and may thus be obtained by retrieving it from an internal memory. If it is not pre-defined as in embodiment A described above in the section "Improved MU-MIMO power control", obtaining the power adaptation parameter may alternatively comprise receiving the power adaptation parameter from the RBS. The power adaptation parameter may be received in a dedicated RRC message or in a broadcast message.
- 520: Receiving an indication from the RBS to use the obtained power adaptation parameter in uplink transmission power control. The indication may be received in a MAC control element or in a PDCCH.
- 530: Adapting an uplink transmission power based on the obtained power adaptation parameter and the received indication.

In embodiment C described above in the section "Improved MU-MIMO power control", the received power adaptation parameter is the indication to use the power adaptation parameter in uplink transmission power control. Steps 510 and 520 are thus combined into one.

According to the first embodiment described in the section "Improved MU-MIMO power control", the power adaptation parameter comprises a positive power step size for uplink transmission power control when the first UE is scheduled in pair with the second UE, and a negative power step size for uplink transmission power control when the first UE is scheduled de-paired from the second UE. According to the second embodiment described in the section "Improved MU-MIMO power control", the power adaptation parameter comprises a first transmission power offset for uplink transmission power control when the first UE is scheduled in pair with the second UE, and a second transmission power offset for uplink transmission power control when the first UE is scheduled de-paired from the second UE.

Figure 6:
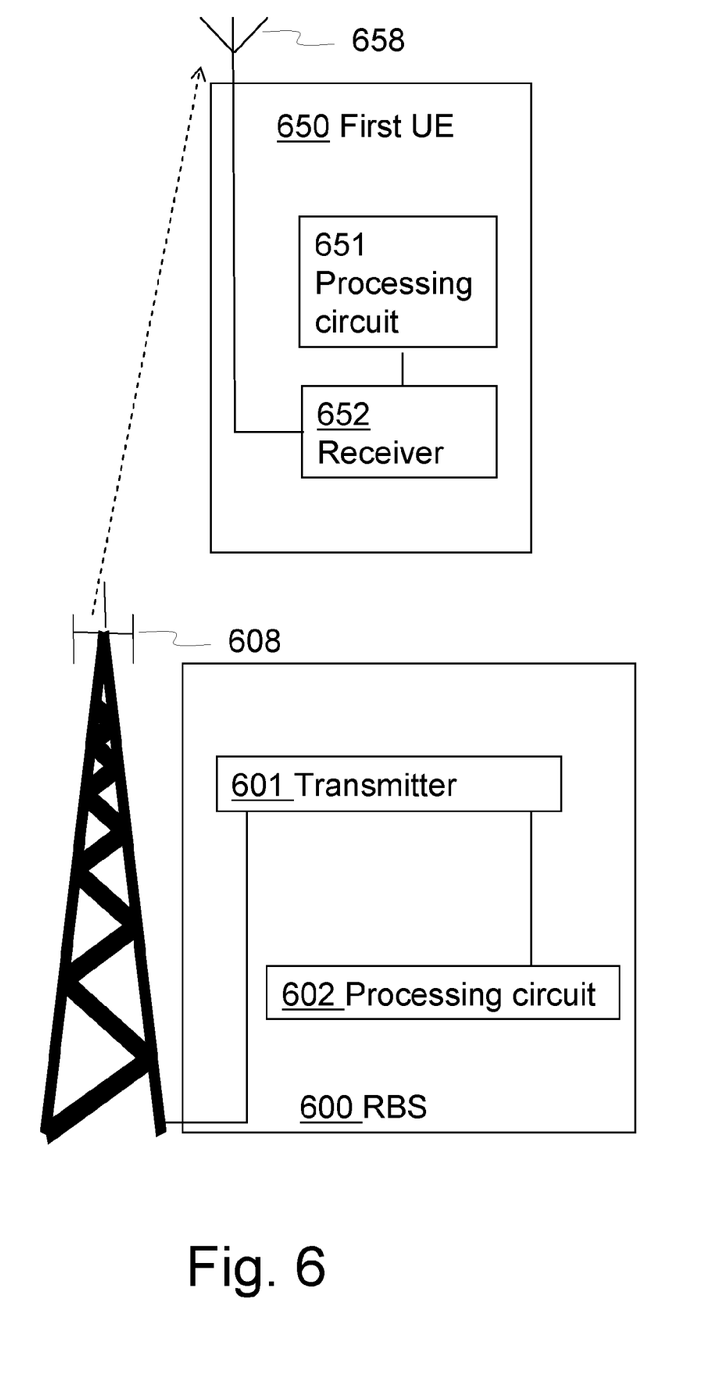
FIG. 6 is a block diagram schematically illustrating an RBS and a UE according to embodiments.

An embodiment of an RBS 600 and a first UE 650 is schematically illustrated in the block diagram in FIG. 6. The RBS 600 is configured to support uplink power control when performing MU-MIMO scheduling. The RBS 600 comprises a transmitter 601 configured to transmit an indication to the first UE to use a power adaptation parameter for uplink transmission power control when the RBS schedules the first UE in pair with a second UE, or schedules the first UE de-paired from the second UE. The power adaptation parameter enables the first UE to adapt an uplink transmission power to an interference change due to pairing or de-pairing with the second UE. The transmitter 601 may be connected to one or more transmitting antennas 608. The transmitter 601 may be further configured to transmit the power adaptation parameter to the first UE before transmitting the indication, in accordance with embodiment A described above in the section "Improved MU-MIMO power control". The transmitter 601 may be further configured to transmit the indication by transmitting the power adaptation parameter to the first UE, in accordance with embodiment C described above in the section "Improved MU-MIMO power control".

According to the first embodiment described in the section "Improved MU-MIMO power control", the power adaptation parameter comprises a positive power step size for uplink transmission power control when the first UE is scheduled in pair with the second UE, and a negative power step size for uplink transmission power control when the first UE is scheduled de-paired from the second UE. According to the second embodiment described in the section "Improved MU-MIMO power control", the power adaptation parameter comprises a first transmission power offset for uplink transmission power control when the first UE is scheduled in pair with the second UE, and a second transmission power offset for uplink transmission power control when the first UE is scheduled de-paired from the second UE.

In another embodiment, the RBS 600 may further comprise a processing unit 602 configured to estimate a throughput gain of a paired scheduling relative to an unpaired scheduling for a UE pair comprising the first UE and the second UE, and for each of the first and the second UEs individually. The processing circuit 602 is in this embodiment further configured to schedule the first UE in pair with the second UE when the estimated throughput gain for the UE pair is above a first threshold, and and when the estimated throughput gain is positive for each of the first and second UEs. The processing circuit 602 is in this embodiment also configured to schedule the first UE de-paired from the second UE when the estimated throughput gain for the UE pair is lower than a second threshold, or when the estimated throughput gain is negative for either the first or the second UE.

In still another embodiment, the processing unit is configured to predict a signal to noise and interference value for each of the first and the second UE as paired or de-paired. The processing unit is further configured to use the predicted signal to noise and interference values when performing link adaptation.

The first UE 650 in FIG. 6 is configured to be served by an RBS 600 of a wireless network. The first UE 650 is also configured for uplink power control at MU-MIMO scheduling. The first UE 650 comprises a processing circuit 651 configured to obtain a power adaptation parameter for use in uplink transmission power control when the first UE is scheduled in pair with a second UE, or is scheduled de-paired from the second UE. The first UE also comprises a receiver 652 configured to receive an indication from the RBS to use the obtained power adaptation parameter in uplink transmission power control. The receiver 652 may be connected to one or more receiving antennas 658. The processing circuit 651 is further configured to adapt an uplink transmission power based on the obtained power adaptation parameter and the received indication.

In accordance with embodiment B described above in the section "Improved MU-MIMO power control", the power adaptation parameter may be pre-defined, and the processing circuit 651 may be configured to obtain the parameter by retrieving it from an internal memory. If the parameter is not pre-defined as in embodiment A described above in the section "Improved MU-MIMO power control", the receiver may be further configured to receive the power adaptation parameter from the RBS. The power adaptation parameter may be received in a dedicated RRC message or in a broadcast message. In one embodiment, the received power adaptation parameter is the indication to use the power adaptation parameter in uplink transmission power control.

According to the first embodiment described in the section "Improved MU-MIMO power control", the power adaptation parameter comprises a positive power step size for uplink transmission power control when the first UE is scheduled in pair with the second UE, and a negative power step size for uplink transmission power control when the first UE is scheduled de-paired from the second UE. According to the second embodiment described in the section "Improved MU-MIMO power control", the power adaptation parameter comprises a first transmission power offset for uplink transmission power control when the first UE is scheduled in pair with the second UE, and a second transmission power offset for uplink transmission power control when the first UE is scheduled de-paired from the second UE.

The processing circuits, the transmitters, and the receivers described above with reference to FIG. 6 may be logical units, separate physical units or a combination of both logical and physical units.

In an alternative way to describe the embodiments in FIG. 6, the RBS 600 and the first UE 650 each comprises a Central Processing Unit (CPU) which may be a single unit or a plurality of units. Furthermore, the RBS 600 and the first UE 650 each comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the RBS 600 and the first UE 650 respectively causes the CPU to perform steps of the procedures described earlier in conjunction with FIGS. 4*a-b* and 5 respectively. In other words, when said code means are run on the CPU, they correspond to the processing circuits 602/651 of FIG. 6.

The above mentioned and described embodiments are only given as examples and should not be limiting. Other solutions, uses, objectives, and functions within the scope of the accompanying patent claims may be possible.

The invention claimed is:

1. A method in a radio base station of a wireless network, for supporting uplink power control when performing Multiple User Multiple-Input-Multiple-Output scheduling, the method comprising when scheduling a first user equipment (UE) in pair with a second UE, or scheduling the first UE de-paired from the second UE:
transmitting an indication to the first UE to use a power adaptation parameter for uplink transmission power control, wherein the power adaptation parameter enables the first UE to adapt an uplink transmission power to an interference change due to pairing or de-pairing with the second UE.

2. The method according to claim 1, further comprising transmitting the power adaptation parameter to the first UE before transmitting the indication.

3. The method according to claim 1, wherein the indication is transmitted in a media access control element or in a physical downlink control channel.

4. The method according to claim 1, wherein transmitting the indication comprises transmitting the power adaptation parameter to the first UE.

5. The method according to claim 2, wherein the power adaptation parameter is transmitted in a dedicated radio resource control message or in a broadcast message.

6. The method according to claim 1, wherein the power adaptation parameter comprises a positive power step size for uplink transmission power control when the first UE is scheduled to be in pair with the second UE, and a negative power step size for uplink transmission power control when the first UE is scheduled to be de-paired from the second UE.

7. The method according to claim 1, wherein the power adaptation parameter comprises a first transmission power offset for uplink transmission power control when the first UE is scheduled to be in pair with the second UE, and a second transmission power offset for uplink transmission power control when the first UE is scheduled to be de-paired from the second UE.

8. The method according to claim 1, further comprising:
estimating a throughput gain of a paired scheduling relative to an unpaired scheduling for a UE pair comprising the first UE and the second UE, and for each of the first and the second UEs individually,
the method comprising when the first UE is initially unpaired:
scheduling the first UE to be in pair with the second UE when the estimated throughput gain for the UE pair is above a first threshold, and when the estimated throughput gain is positive for each of the first and second UEs,
the method comprising when the first UE is initially paired with the second UE:
scheduling the first UE to be de-paired from the second UE when the estimated throughput gain for the UE pair is lower than a second threshold, or when the estimated throughput gain is negative for either the first or the second UE.

9. The method according to claim 8, further comprising:
when scheduling the first UE to be in pair with the second UE,
predicting a signal to noise and interference value for each of the first and the second UE as paired; and
using the predicted signal to noise and interference values when performing link adaptation.

10. The method according to claim 8, further comprising:
when scheduling the first UE to be de-paired from the second UE,
predicting a signal to noise and interference value for each of the first and the second UE as de-paired; and
using the predicted signal to noise and interference values when performing link adaptation.

11. A method in a first User Equipment (UE) served by a radio base station of a wireless network, for uplink power control at Multiple User Multiple-Input-Multiple-Output scheduling, the method comprising:
obtaining a power adaptation parameter for use in uplink transmission power control when the first UE is scheduled to be in pair with a second UE, or is scheduled to be de-paired from the second UE;

receiving an indication from the radio base station to use the obtained power adaptation parameter in uplink transmission power control; and adapting an uplink transmission power based on the obtained power adaptation parameter and the received indication, wherein the power adaptation parameter comprises a first transmission power offset for uplink transmission power control when the first UE is scheduled to be in pair with the second UE, and a second transmission power offset for uplink transmission power control when the first UE is scheduled to be de-paired from the second UE.

12. The method according to claim 11, wherein the power adaptation parameter is pre-defined.

13. The method according to claim 11, wherein obtaining the power adaptation parameter comprises receiving the power adaptation parameter from the radio base station.

14. The method according to claim 11, wherein the indication is received in a media access control element or in a physical downlink control channel.

15. The method according to claim 13, wherein the received power adaptation parameter is the indication to use the power adaptation parameter in uplink transmission power control.

16. The method according to claim 13, wherein the power adaptation parameter is received in a dedicated radio resource control message or in a broadcast message.

17. The method according to claim 11, wherein the power adaptation parameter comprises a positive power step size for uplink transmission power control when the first UE is scheduled to be in pair with the second UE, and a negative power step size for uplink transmission power control when the first UE is scheduled to be de-paired from the second UE.

18. A radio base station of a wireless network, configured to support uplink power control when performing Multiple User Multiple-Input-Multiple-Output scheduling, the radio base station comprising:
a transmitter configured to transmit an indication to a first user equipment (UE) to use a power adaptation parameter for uplink transmission power control when the radio base station schedules the first UE to be in pair with a second UE, or schedules the first UE to be de-paired from the second UE, wherein the power adaptation parameter enables the first UE to adapt an uplink transmission power to an interference change due to pairing or de-pairing with the second UE.

19. The radio base station according to claim 18, wherein the transmitter is further configured to transmit the power adaptation parameter to the first UE before transmitting the indication.

20. The radio base station according to claim 18, wherein the transmitter is further configured to transmit the indication by transmitting the power adaptation parameter to the first UE.

21. The radio base station according to claim 18, wherein the power adaptation parameter comprises a positive power step size for uplink transmission power control when the first UE is scheduled to be in pair with the second UE, and a negative power step size for uplink transmission power control when the first UE is scheduled to be de-paired from the second UE.

22. The radio base station according to claim 18, wherein the power adaptation parameter comprises a first transmission power offset for uplink transmission power control when the first UE is scheduled to be in pair with the second UE, and a second transmission power offset for uplink transmission power control when the first UE is scheduled to be de-paired from the second UE.

23. The radio base station according to claim 18, further comprising a processing unit configured to:
estimate a throughput gain of a paired scheduling relative to an unpaired scheduling for a UE pair comprising the first UE and the second UE, and for each of the first and the second UEs individually,
schedule the first UE to be in pair with the second UE when the estimated throughput gain for the UE pair is above a first threshold, and when the estimated throughput gain is positive for each of the first and second UEs, and
schedule the first UE to be de-paired from the second UE when the estimated throughput gain for the UE pair is lower than a second threshold, or when the estimated throughput gain is negative for either the first or the second UE.

24. The radio base station according to claim 23, wherein the processing unit is configured to predict a signal to noise and interference value for each of the first and the second UE as paired or de-paired and the processing unit is configured to use the predicted signal to noise and interference values when performing link adaptation.

25. A first User Equipment (UE) configured to be served by a radio base station of a wireless network, and configured for uplink power control at Multiple User Multiple-Input-Multiple-Output scheduling, the first UE comprising:
a processing circuit configured to obtain a power adaptation parameter for use in uplink transmission power control when the first UE is scheduled to be in pair with a second UE, or is scheduled to be de-paired from the second UE, and
a receiver configured to receive an indication from the radio base station to use the obtained power adaptation parameter in uplink transmission power control,
wherein the use of the obtained power adaptation parameter based on the received indication, enables the first UE to adapt an uplink transmission power to an interference change due to pairing or de-pairing with the second UE.

26. The first UE according to claim 25, wherein the power adaptation parameter is pre-defined.

27. The first UE according to claim 25, wherein the receiver is further configured to receive the power adaptation parameter from the radio base station.

28. The first UE according to claim 27, wherein the received power adaptation parameter is the indication to use the power adaptation parameter in uplink transmission power control.

29. The first UE according to claim 25, wherein the power adaptation parameter comprises a positive power step size for uplink transmission power control when the first UE is scheduled to be in pair with the second UE, and a negative power step size for uplink transmission power control when the first UE is scheduled to be de-paired from the second UE.

30. The first UE according to claim 25, wherein the power adaptation parameter comprises a first transmission power offset for uplink transmission power control when the first UE is scheduled to be in pair with the second UE, and a second transmission power offset for uplink transmission power control when the first UE is scheduled to be de-paired from the second UE.

* * * * *